Dec. 7, 1926.
A. H. BROCKETT
1,610,118
FUEL FEEDING SYSTEM
Filed April 14, 1925
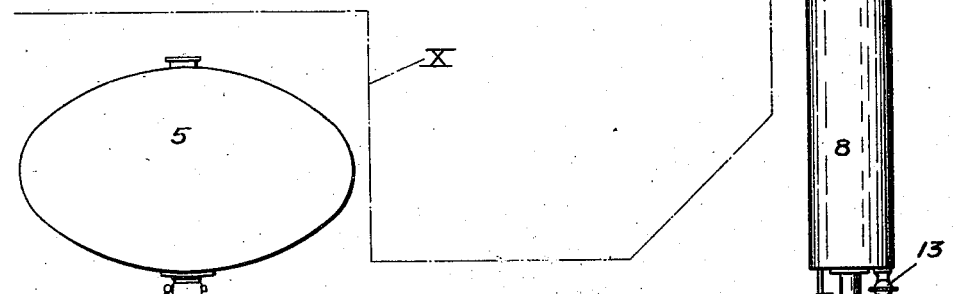
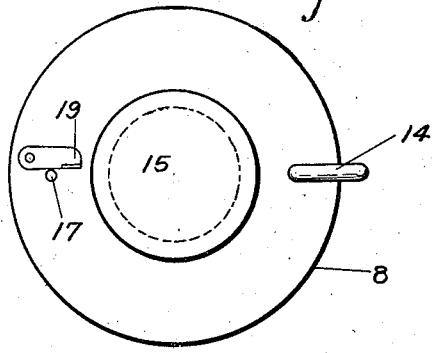
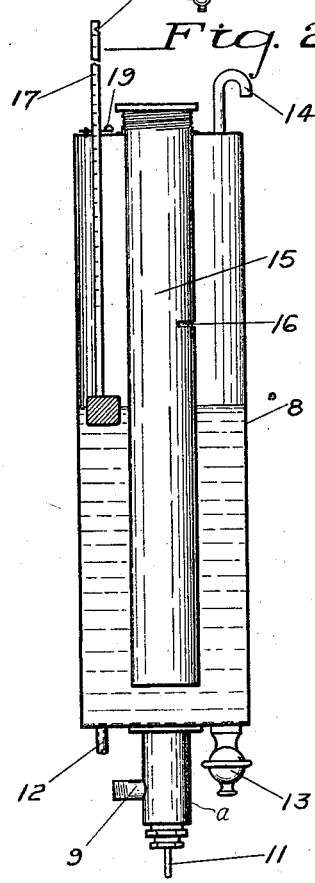
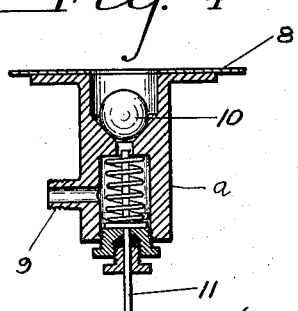
INVENTOR.
Ashley H. Brockett
BY
ATTORNEY.

Patented Dec. 7, 1926.

1,610,118

UNITED STATES PATENT OFFICE.

ASHLEY H. BROCKETT, OF PITTSBURGH, PENNSYLVANIA.

FUEL-FEEDING SYSTEM.

Application filed April 14, 1925. Serial No. 23,007.

This invention is for a fuel feeding device for automobile power plants where the fuel is fed by gravity to the carburetor. In some automobiles and other vehicles, a gravity fuel feeding system is used in transferring the fuel from the supply reservoir to the carburetor. Such a system is used, for instance, in Ford automobiles.

In such systems of fuel feeding, the fuel tank is generally located on the vehicle at some point well back of the engine and at a very slight normal elevation with respect to the carburetor. When the car is going up a fairly steep grade, difficulty is encountered in feeding fuel to the carburetor unless the supply tank is nearly full.

The present invention, which is particularly though not necessarily applicable to Ford cars, has for its object to provide a system wherein a considerable head of fuel may be assured, even when the fluid level in the main tank is very low.

A further object of the invention is to provide a self-filling emergency reservoir wherein a small supply of fuel for emergency purposes is always available.

Another object of the invention is to provide a convenient means for determining the fuel level in the tank where the tank is not conveniently accessible.

These and other objects and advantages are attained by the invention which may be readily understood by reference to the accompanying drawings, in which:

Fig. 1 is a side elevation of a fuel feeding system embodying the invention;

Fig. 2 shows a vertical section through the auxiliary tank;

Fig. 3 is a top plan view of the tank of Fig. 2;

Fig. 4 is a detail section of a valve which is preferably used in the invention.

In Fig. 1, the arrangement is similar to that found in Ford cars, with the exception that my invention is included therein. The outline $x$ designates a Ford or other motor vehicle.

The main fuel tank is designated 5, and in Ford cars is generally located under the front seat. Leading from the bottom of this tank is a fuel feed pipe 6. Ordinarily, this pipe leads directly to the carburetor 7. According to the present invention, the pipe 6 leads to the bottom of an auxiliary tank 8 through a connection 9, with a valve casing $a$ having an upper valve seated cavity in which is a ball or other suitable gravitating check valve 10. A suitable spring retracted push rod 11, extending through the bottom of casing $a$, is provided in the valve body or casing $a$ for temporarily unseating the check valve for the purpose hereinafter explained.

Leading from the bottom of tank 8 is a pipe 12 going to the carburetor 7. The tank 8 is preferably in the form of a metal cylinder of small diameter, and considerable height, and is secured to the front of the dash and well above the carburetor, so that there is a considerable drop in pipe 12. A drain cock 13 may also be provided in the bottom of the tank.

A suitable air vent 14 may be provided in the top of the tank. Screwed into a threaded opening in the top of the tank is a cylindrical emergency container 15 having a closed bottom, but having an opening 16 in the side thereof well above the bottom, and preferably above the middle thereof.

Passing through the top of the tank 8 is an indicator rod 17 on a level indicating float 18. A small catch 19 pivoted on the top of the tank may be moved into and out of engagement with the rod, this catch, when engaging the rod holding it depressed, being then entered in a small notch 17' near the top of the rod.

In operation, when fuel is put in the main tank 5, it will seek its level in tank 8. If the car then starts up a grade, so that the main tank is lower than the auxiliary tank, the check valve will prevent the back flow of fuel, and a head will thus be maintained in the auxiliary tank, of sufficient volume and almost directly over the carburetor to carry the car up a long grade. When the car goes down hill, so that the auxiliary tank 8 is below the main supply, the depth of liquid in the auxiliary tank will be increased well above that in the main tank.

Thus, when traveling through hilly country an effective gas feed can be automatically maintained, even though the supply in the main tank is quite low. Furthermore, when the depth in the auxiliary tank reaches opening 16 in the emergency cylinder 15, this cylinder will fill to that level with fuel, and this fuel will be trapped. When fuel is needed for emergency purposes, the cylinder need only be removed and its contents poured into the auxiliary tank. While the volume of fuel in the emergency supply thus provided would be too small to be of use if poured into the main tank, it will be most effective when poured into the small auxiliary tank almost directly above the carburetor. This emergency supply is automatically replenished when the car is re-fueled.

In Ford automobiles, it is necessary to lift the cushion in the front seat to measure the supply of gasoline. By providing a float indicator in the auxiliary chamber, the fuel level may be easily measured. However, the level in the float tank may be false, due to the fact that fuel is trapped therein going down grade. The purpose of the push-rod 11 is to unseat valve 10 to restore equal levels in the two tanks when the amount of fuel in the main tank is to be measured.

The device may be cheaply manufactured and can be easily and cheaply installed on automobiles. It overcomes the trouble now encountered where gravity feed systems are used, especially where the automobile is driven over particularly hilly country. It provides a convenient emergency supply of gas, and a convenient means for using a very small emergency supply that would ordinarily be ineffective if emptied directly into the main tank. This would not be so if the check valve were remotely located with respect to the bottom of the tank, instead of immediately below the bottom as with the present construction.

What I claim is:

1. The combination with a fuel feeding system embodying a main tank and a carburetor below the level of the main tank, of an auxiliary tank having a check valve casing extending downwardly therefrom, a pipe leading from the main tank to the check valve casing of the auxiliary tank, a check valve in said casing immediately below the bottom of the auxiliary tank above the outlet end of said pipe to prevent backflow of fuel from the auxiliary tank to the main tank, an unseating stem for the check valve extending downwardly through the check valve casing, and a pipe leading from the bottom of the auxiliary tank to the carburetor.

2. The combination with a fuel feeding system including a main tank and a carburetor below the level of the main tank, of an auxiliary tank having a check valve casing extending downwardly therefrom, a pipe leading from the main tank to the check valve casing of the auxiliary tank, a ball-type check valve in said casing immediately below the bottom of the auxiliary tank above the outlet end of said pipe to prevent backflow of fuel from the auxiliary tank to the main tank, the ball of the valve being close to the bottom of the auxiliary tank, a spring retracted unseating stem for the check valve extending downwardly through the check valve casing, and a pipe leading from the bottom of the auxiliary tank to the carburetor.

3. The combination with a fuel feeding system including a main tank and a carburetor below the level of the main tank, of an auxiliary tank, a pipe leading from the main tank to the bottom of the auxiliary tank, a check valve immediately below the bottom of the auxiliary tank at the outlet end of said pipe to prevent backflow of fuel from the auxiliary tank to the main tank, a pipe leading from the bottom of the auxiliary tank to the carburetor, a float indicator in the auxiliary tank, and means for opening the check valve whereby the level in the auxiliary tank and the main tank may be equalized when it is desired to measure the amount of fuel in the system.

In testimony whereof I hereunto affix my signature.

ASHLEY H. BROCKETT.